United States Patent
Kugino et al.

(10) Patent No.: US 9,240,576 B2
(45) Date of Patent: Jan. 19, 2016

(54) NON-AQUEOUS ELECTROLYTE SECONDARY BATTERY

(75) Inventors: Satoshi Kugino, Tokyo (JP); Yuichiro Mishiro, Tokyo (JP); Murashi Shinto, Tokyo (JP); Kenzou Ikeda, Tokyo (JP); Akira Tanaka, Tokyo (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 343 days.

(21) Appl. No.: 13/823,178

(22) PCT Filed: Sep. 21, 2011

(86) PCT No.: PCT/JP2011/071480

§ 371 (c)(1),
(2), (4) Date: Mar. 14, 2013

(87) PCT Pub. No.: WO2012/039423

PCT Pub. Date: Mar. 29, 2012

(65) Prior Publication Data

US 2013/0177803 A1 Jul. 11, 2013

(30) Foreign Application Priority Data

Sep. 21, 2010 (JP) .................................. 2010-210416

(51) Int. Cl.
*H01M 2/04* (2006.01)
*H01M 2/06* (2006.01)
*H01M 2/08* (2006.01)
(Continued)

(52) U.S. Cl.
CPC .............. *H01M 2/04* (2013.01); *H01M 2/0404* (2013.01); *H01M 2/0482* (2013.01); *H01M 2/06* (2013.01);
(Continued)

(58) Field of Classification Search
CPC . H01M 10/0525; H01M 2/04; H01M 2/0404; H01M 2/0482; H01M 2/06

USPC ........................................................ 429/442
See application file for complete search history.

(56) References Cited

U.S. PATENT DOCUMENTS

| | | | |
|---|---|---|---|
| 2006/0183020 A1* | 8/2006 | Davidson et al. | 429/174 |
| 2011/0001618 A1* | 1/2011 | Yabushita et al. | 340/442 |
| 2011/0117402 A1* | 5/2011 | Kim et al. | 429/94 |

FOREIGN PATENT DOCUMENTS

| | | |
|---|---|---|
| CN | 2729910 Y | 9/2005 |
| JP | 8-77999 A | 3/1996 |

(Continued)

OTHER PUBLICATIONS

English translation of JP2004253295, Takagi, Sep. 2004, Japan.*

(Continued)

*Primary Examiner* — Jonathan Jelsma
*Assistant Examiner* — Rashid Alam
(74) *Attorney, Agent, or Firm* — Crowell & Moring LLP (57) ABSTRACT

If a non-aqueous electrolyte secondary battery has a seal structure between a lid and an electrode terminal in which a seal member is compressed by fastening a nut, the nut may be loosened to make the amount of compression of the seal member insufficient to reduce the seal performance even if the nut is fastened enough to obtain an appropriate amount of compression of the seal member at the time of manufacture of the battery. A battery case has an opening, and houses an electrode group and an organic electrolyte. A lid is fastened to the battery case, and tightly seals the opening of the battery case. An electrode terminal is electrically connected to the electrode group. The lid and the electrode terminal face each other via an elastic member.

10 Claims, 11 Drawing Sheets (51) Int. Cl.
H01M 2/30 (2006.01)
H01M 10/0525 (2010.01)

(52) U.S. Cl.
CPC H01M 2/08 (2013.01); H01M 2/30 (2013.01); H01M 10/0525 (2013.01); *Y02E 60/122* (2013.01)

(56) References Cited

FOREIGN PATENT DOCUMENTS

| JP | 2002-289156 A | | 10/2002 |
|---|---|---|---|
| JP | 2003-86151 A | | 3/2003 |
| JP | 2004-253295 A | | 9/2004 |
| JP | 2004253295 A | * | 9/2004 |
| JP | 2009-76385 A | | 4/2009 |
| JP | 2009-87613 A | | 4/2009 |
| JP | 2009-134985 A | | 6/2009 |
| JP | 2009-252719 A | | 10/2009 |
| JP | 2010-170920 A | | 8/2010 |

OTHER PUBLICATIONS

Mechanical English translation of document B1 (JP 2004-253295 A) previously filed on Mar. 14, 2013 {Nineteen (19) pages}.

Mechanical English translation of document B2 (JP 2010-170920 A) previously filed on Mar. 14, 2013 {Seventeen (17) pages}.

Mechanical English translation of document B3 (JP 2003-86151 A) previously filed on Mar. 14, 2013 {Seven (7) pages}.

Mechanical English translation of document B4 (JP 2002-289156 A) previously filed on Mar. 14, 2013 {Ten (10) pages}.

Mechanical English translation of document B5 (JP 2009-134985 A) previously filed on Mar. 14, 2013 {Twenty-eight (28) pages}.

Mechanical English translation of document B6 (JP 2009-87613 A) previously filed on Mar. 14, 2013 {Twenty (20) pages}.

Mechanical English translation of document B7 (JP 2009-76385 A) previously filed on Mar. 14, 2013 {Fifteen (15) pages}.

Mechanical English translation of document B8 (JP 2009-252719 A) previously filed on Mar. 14, 2013 {Twenty (20) pages}.

Mechanical English translation of document B9 (JP 8-77999 A) previously filed on Mar. 14, 2013 {Ten (10) pages}.

Chinese Office Action dated Dec. 1, 2014, including partial English translation (ten (10) pages).

International Search Report dated Dec. 20, 2011 w/ English translation (four (4) pages).

* cited by examiner

NON-AQUEOUS ELECTROLYTE SECONDARY BATTERY

TECHNICAL FIELD

The present invention relates to a non-aqueous electrolyte secondary battery, and in particular to a seal structure for a non-aqueous electrolyte secondary battery such as a lithium ion battery that requires high sealing tightness.

BACKGROUND ART

In recent years, batteries with reduced size, reduced weight, and increased energy density have been required as drive power sources for various electric apparatuses such as personal computers, particularly along with their tendency toward cordless and portable configurations. In particular, non-aqueous electrolyte secondary batteries such as lithium ion batteries have high energy density, and are expected as leading products that meet such requirements.

Some non-aqueous electrolyte secondary batteries have a rectangular structure with an electrode member in which a positive electrode and a negative electrode are laminated via a separator, and others have a cylindrical structure with an electrode member formed by winding a laminated member including a positive electrode and a negative electrode laminated via a separator. The electrode member of either structure is housed in a battery case or a battery casing together with a non-aqueous electrolyte. It should be noted, however, that the battery case may have a rectangular outer shape even if a wound electrode member is used as the electrode member.

In the non-aqueous electrolyte secondary batteries, further, a current is drawn from the electrode member via a positive current collecting member and a negative current collecting member connected to the positive electrode and the negative electrode, respectively. That is, the current collecting members are fixed at an end portion of the electrode member, and a positive terminal and a negative terminal connected to the positive current collecting member and the negative current collecting member, respectively, for electrical conduction are projected out of the battery case through terminal leading holes (terminal through holes) formed in a lid of the battery case. In an example of a seal structure for the terminal leading holes, a seal member (for example, a gasket) is provided between an inner wall surface around a portion of the lid formed with the terminal leading holes and terminal body portions of the electrode terminals having threaded terminal portions when the electrode terminals are inserted through the terminal leading holes of the battery case from the inner side of the battery case, and a nut is fastened via a washer and the gasket onto a threaded portion of the threaded terminal portions of the electrode terminals projecting out of the battery case to pull up the electrode terminals out of the battery case and compress the seal member between the inner wall surface of the lid and the terminal body portions of the electrode terminals (see Patent Documents 1, 2, and 3, for example).

RELATED ART DOCUMENTS

Patent Documents

Patent Document 1: JP08-77999A
Patent Document 2: JP2009-1349A
Patent Document 3: JP2009-252719A

SUMMARY OF INVENTION

Technical Problem

In Patent Documents 1, 2, and 3, the amount of compression of the seal member significantly depends on the degree of fastening of the nut. Therefore, even if the nut is fastened enough to obtain an appropriate amount of compression of the seal member at the time of manufacture of the battery, the amount of compression of the seal member may become insufficient if the nut is loosened thereafter, which may disadvantageously reduce the seal performance.

In order to address the foregoing issue, it is an object of the present invention to provide a seal structure with a minimum reduction in seal performance after start of use of a battery.

Means for Solving the Problems

In order to address the foregoing issue, the present invention provides a non-aqueous electrolyte secondary battery including: a battery case including a case body portion having an opening, and a lid configured to tightly seal the opening of the case body portion; an electrode group and an organic electrolyte housed in the battery case; and a plurality of electrode terminals. The electrode terminals each include a terminal body portion electrically connected to the electrode group and a threaded terminal portion integrally formed with the terminal body portion and configured to pass through the lid, and each electrode terminal is fixed to the lid with a nut fastened around the threaded terminal portion of the electrode terminal. The non-aqueous electrolyte secondary battery according to the present invention includes an elastic member disposed and compressed between the terminal body portion of the electrode terminal and the lid of the battery case. The compressed elastic member imparts a force to the terminal body portion of the electrode terminal in the direction away from the lid. The force acts to draw the threaded terminal portion toward the inside of the battery case, thereby suppressing loosening of the nut.

In particular, the elastic member is preferably made of a rubber-based material. The rubber-based material may be at least one kind selected from chloroprene rubber, nitrile rubber, ethylene propylene rubber, butyl rubber, urethane rubber, fluororubber, and silicon rubber. Such rubber-based materials are not particularly dissolved in a non-aqueous electrolyte upon contact with the non-aqueous electrolyte, and therefore do not affect the battery performance.

The non-aqueous electrolyte secondary battery may further include a gasket disposed between the terminal body portion and the lid on an outer side of the elastic member. Use of the gasket promotes prevention of loosening of the nut. The gasket is preferably formed of a resin material. As specific examples of the resin material of the gasket, the gasket may be at least one kind selected from a rubber gasket, a synthetic resin gasket, a semi-metallic gasket, and an expanded graphite gasket. Such resin materials are also not particularly dissolved in a non-aqueous electrolyte upon contact with the non-aqueous electrolyte, and therefore do not affect the battery performance.

The non-aqueous electrolyte secondary battery may further include a filled resin portion formed by filling a resin material into a recess defined by the lid, the terminal body portion, and the elastic member and letting the resin material become cured. Providing such a filled resin portion prevents a reduction in effect of the elastic member due to expansion of the elastic member in the recess, and allows the filled resin portion to exercise a seal effect, thereby enhancing the seal performance.

A stepped groove may be formed in each of the lid and the terminal body portion of the electrode terminal, and the elastic member and the gasket may be disposed in the stepped grooves. This allows the elastic member and the gasket to be reliably positioned.

The elastic member preferably has an annular shape to surround the threaded terminal portion. The gasket preferably has an annular shape to surround the threaded terminal portion. The stepped groove formed in the lid may include a first lid-side annular stepped portion and a second lid-side annular stepped portion. The first lid-side annular stepped portion is formed concentrically with the terminal through hole. The second lid-side annular stepped portion is formed concentrically and continuously with the first lid-side annular stepped portion. The first lid-side annular stepped portion and the second lid-side annular stepped portion are formed in a back surface portion of the lid facing the terminal body portion. The stepped groove formed in the terminal body portion may include a first terminal-side annular stepped portion concentrically formed with the threaded terminal portion to face the first lid-side annular stepped portion with the threaded terminal portion fitted in the terminal through hole, and a second terminal-side annular stepped portion concentrically formed with the first terminal-side annular stepped portion and continuously formed with the first terminal-side annular stepped portion to face the second lid-side annular stepped portion with the threaded terminal portion fitted in the terminal through hole. In this case, the elastic member may be disposed between the first lid-side annular stepped portion and the first terminal-side annular stepped portion. The gasket may be disposed between the second lid-side annular stepped portion and the second terminal-side annular stepped portion. The second elastic member is preferably in contact with the gasket. Adopting such an arrangement ensures positioning and a seal effect.

A more specific example of the non-aqueous electrolyte secondary battery includes a battery case including a case body portion having an opening, and a lid having a plurality of terminal through holes and configured to tightly seal the opening of the case body portion. The specific example of the non-aqueous electrolyte secondary battery also includes: a first gasket fitted to the threaded terminal portion of the electrode terminal and disposed between the lid and the nut; and a second gasket disposed on the terminal body portion to surround the threaded terminal portion, and disposed between the terminal body portion of the electrode terminal and the lid of the battery case. The specific example of the non-aqueous electrolyte secondary battery additionally includes an annular elastic member disposed on the terminal body portion to surround the threaded terminal portion on an inner side of the second gasket, the annular elastic member being compressed between the terminal body portion of the electrode terminal and the lid of the battery case. Such an arrangement prevents loosening of the nut and enhances the seal performance through cooperation between the annular elastic member and the second gasket.

If the second gasket is formed from an elastic material, the second gasket and the elastic member may be integrally formed with each other. This not only allows a reduction in number of components but also facilitates assembly.

The first gasket may include a fitted portion fitted in the annular recess formed between the terminal through hole and the threaded terminal portion. Providing the first gasket with such a fitted portion allows apart of the annular recess to be occupied by the fitted portion, thereby reducing the amount of the resin material to be used. The fitted portion of the first gasket is preferably formed with a passage configured to introduce the resin material into the annular recess. The presence of such a passage allows filling of the resin material after the first gasket is disposed, thereby facilitating the work of filling the resin material.

DESCRIPTION OF EMBODIMENTS

Embodiments of the present invention will be described in detail below with reference to the drawings. It should be noted, however, that the sizes, materials, shapes, relative positions, and so forth of constituent components described in the following embodiments are merely exemplary and for illustration only, rather than limiting the technical scope of the present invention to such embodiments, unless specifically stated otherwise.

(First Embodiment)

Figure 1:
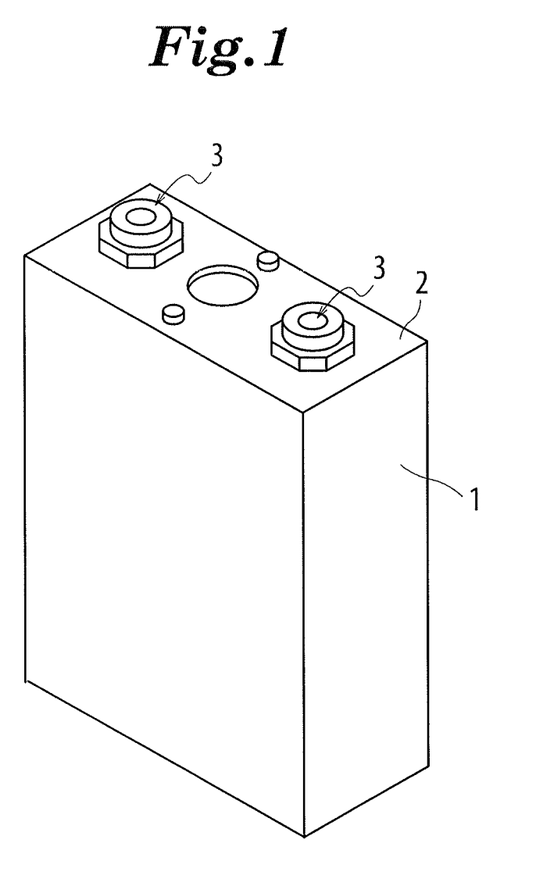
FIG. 1 is a perspective view showing the appearance of a non-aqueous electrolyte secondary battery according to a first embodiment of the present invention.
Figure 2:
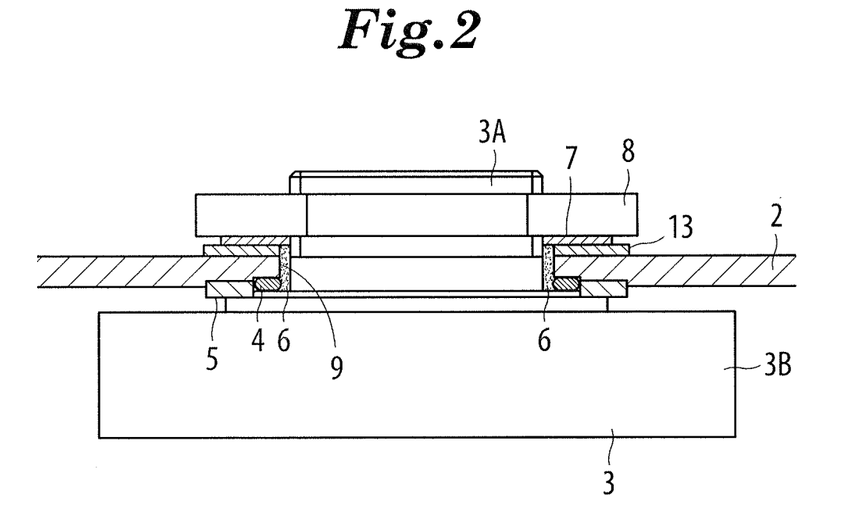
FIG. 2 is a cross-sectional view of a terminal attachment structure of the non-aqueous electrolyte secondary battery used to describe a terminal seal structure according to the first embodiment.
Figure 3:
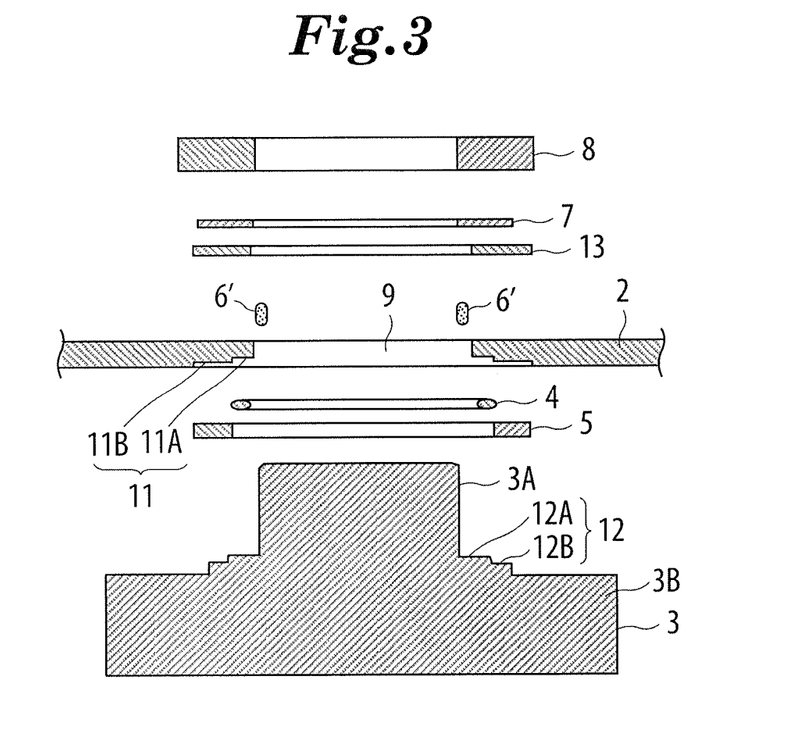
FIG. 3 is an exploded cross-sectional view of the terminal attachment structure of FIG. 2.

FIG. 1 is a perspective view showing the appearance of a non-aqueous electrolyte secondary battery according to a first embodiment of the present invention. FIG. 2 is a cross-sectional view of a terminal attachment structure of the non-aqueous electrolyte secondary battery used to describe a terminal seal structure. In FIG. 2, an electrode terminal 3 and a nut 8 to be discussed later are not shown in cross section. FIG. 3 is an exploded cross-sectional view of the terminal attachment structure of FIG. 2. In FIG. 1, reference numeral 1 denotes a case body portion made of stainless steel and having an opening, and reference numeral 2 denotes a lid made of stainless steel and configured to tightly seal the opening of the case body portion 1. In the embodiment, the case body portion 1 and the lid 2 form a battery case. An electrode group and an organic electrolyte are housed in the battery case. The material of the case body portion 1 and the lid 2 is not limited to stainless steel, and may be other metals having electrolyte resistance properties such as aluminum and aluminum alloys, for example, and resin materials such as epoxy resins.

The lid 2 is formed with two terminal through holes 9. In FIGS. 2 and 3, only one terminal through hole 9 is shown. An electrode terminal 3 for current collection is made of aluminum or copper, and includes a threaded terminal portion 3A that passes through the terminal through hole 9 and a terminal body portion 3B electrically connected to an electrode group (not shown), which are integral with each other. As shown in FIG. 3, a stepped groove 11 is formed in a back surface portion, which faces the terminal body portion 3B, of the lid 2. The stepped groove 11 includes a first lid-side annular stepped portion 11A formed concentrically with the terminal through hole 9, and a second lid-side annular stepped portion 11B formed concentrically and continuously with the first lid-side annular stepped portion 11A. The terminal body portion 3B of the electrode terminal 3 is formed with a first terminal-side annular stepped portion 12A and a second terminal-side annular stepped portion 12B with the threaded terminal portion 3A being fitted in the terminal through hole 9. The first terminal-side annular stepped portion 12B is formed concentrically with the threaded terminal portion 3A and facing the first lid-side annular stepped portion 11A. The second terminal-side annular stepped portion 12B is formed concentrically and continuously with the first terminal-side annular stepped portion 12A and faces the second lid-side annular stepped portion 11B. The first terminal-side annular stepped portion 12A and the second terminal-side annular stepped portion 12B form a stepped groove 12 provided on the terminal body portion 3B.

The electrode terminal 3 is fixed to the lid 2 with a nut 8 fastened via a gasket 5 and a metal washer 7 around the threaded terminal portion 3A passing through the terminal through hole 9 in the lid 2.

An annular elastic member 4 made of an electrically insulating material is disposed and compressed between the terminal body portion 3B of the electrode terminal 3 and the lid 2 of the battery case. The compressed elastic member 4 imparts a force to the terminal body portion 3B of the electrode terminal 3 in the direction away from the lid 2. The force acts to draw the threaded terminal portion 3A toward the inside of the battery case, thereby suppressing loosening of the nut 8. The annular elastic member 4 also secures insulation between the lid 2 and the electrode terminal 3. Because it is intended to secure seal performance by compressing the elastic member 4, the elastic member 4 is preferably made of a material having a moderate compression reaction force. In the embodiment, the elastic member 4 is made of a rubber-based material. The rubber-based material may be selected from the group consisting of chloroprene rubber, nitrile rubber, ethylene propylene rubber, butyl rubber, urethane rubber, fluororubber, and silicon rubber. In the embodiment, a fluororubber is selected as the rubber-based material, and the rubber-based material has an O-ring shape.

In order to secure seal performance by interposing the elastic member 4, it is necessary to fix the position of the elastic member 4. Thus, the annular elastic member 4 is disposed between the first lid-side annular stepped portion 11A and the first terminal-side annular stepped portion 12A. In order to prevent the elastic member 4 from being displaced radially outward when compressing the elastic member 4, in addition, an annular resin gasket 5 (second gasket) is provided. The annular gasket 5 is in contact with the outer peripheral surface of the annular elastic member 4, and is disposed between the second lid-side annular stepped portion 11B of the lid 2 and the second terminal-side annular stepped portion 12B of the terminal body portion 3B of the electrode terminal 3. Preferably, the resin material of the resin gasket 5 according to the embodiment is selected from the group consisting of polyolefin-based resins such as polypropylene (PP) and polyethylene (PE); fluorine resins such as perfluoro alkoxy alkane (PFA) and polytetrafluoroethylene (PTFE); and polymer materials such as polyphenylene sulfide (PPS), polyimide resins, polyamide-imide resins, polyether ether ketone resins (PEEK), and polyether sulfone resins (PES), and is hard enough to prevent displacement due to crushing by compression of the elastic member 4. In the embodiment, PFA is selected, and the gasket 5 has an annular disk shape because it is disposed at the outer peripheral portion of the elastic member 4.

Figure 4A:
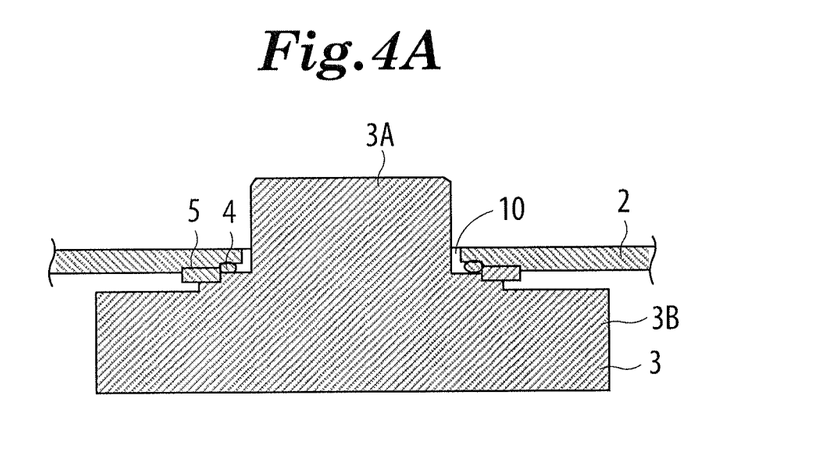
FIGS. 4A and 4B each show a part of an assembly process.
Figure 4B:
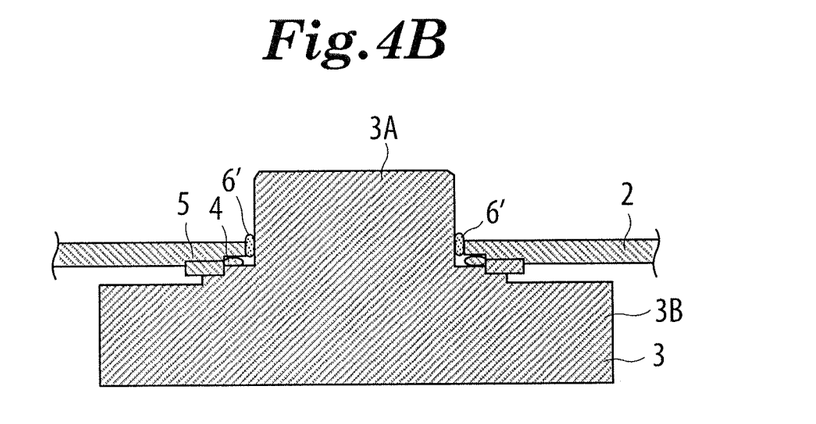

As shown in FIG. 4A, when the lid 2 and the terminal body portion 3B of the electrode terminal 3 are disposed to face each other via the resin gasket 5 and the elastic member 4, a recess 10 is defined by the inner peripheral portion of the elastic member 4, the terminal body portion 3B of the electrode terminal 3, and the lid 2. The recess 10 is in contact with outside air, and is considered to significantly reduce the seal performance of the elastic member 4 if moisture or the like enters the recess 10. In addition, the presence of the recess 10 may permit the elastic member 4 to enter the recess 10, and may permit displacement of the elastic member 4. Therefore, in the embodiment, as shown in FIGS. 2, 3, and 4B, a filled resin portion 6 is formed by filling a resin material 6' into the recess 10 and letting the resin material 6' become cured. In the embodiment, as shown in FIG. 2, the resin material 6' also enters a space inside a gasket (first gasket) 13 provided on the lid 2, and thus the filled resin portion 6 extends not only in the recess 10 but also out of the recess 10. When the nut 8 is fastened, the elastic member 4 is crushed and deformed. Thus, the diameter of the terminal through hole 9 is smaller than the inside diameter of the elastic member 4. That is, it is necessary that the resin material should also fill a space created because of such a difference in diameter. Hence, it is important that the viscosity of the resin material for forming the filled resin portion 6 should not be too high. It is also important that the curing temperature of the resin material should not be too high because components made of a resin material such as the elastic member 4 and the resin gasket 5 are disposed around the resin material when letting the filled resin material become cured.

For this reason, in the embodiment, a thermosetting, two-part mixed epoxy resin is used as the resin material 6' for forming the filled resin portion 6. The resin material 6' is not limited to the two-part mixed epoxy resin used in the embodiment, and may be other resin materials that become cured around room temperature and that preferably have electrolyte resistance properties. Providing the filled resin portion 6 in addition to the elastic member 4 increases air tightness, and enables the electrode terminal 3 and the lid 2 to be disposed not to directly contact each other.

After the recess 10 is filled with the resin material 6' for forming the filled resin portion 6, the resin gasket 13 and the metal washer 7 are placed around a threaded portion of the threaded terminal portion 3A of the electrode terminal 3 and the nut 8 is fastened, before the resin material 6' becomes cured. By fastening the nut 8, the electrode terminal 3 is pulled up in the direction of the lid 2. As the elastic member 4 is compressed, the resin material 6' is pushed up along the threaded terminal portion 3A of the electrode terminal 3 so that the resin material 6' enters a space inside the gasket 13. When the resin material 6' becomes cured to form the filled resin portion 6, the seal performance is ensured.

In the embodiment, the resin gasket 13 is made of PFA as with the resin gasket 5. It should be noted, however, that the gasket 13 has a larger width (width in the radial direction) than the resin gasket 5 to prevent the resin material 6' from expanding in the radial direction of the threaded terminal portion 3A of the electrode terminal 3 when the resin material 6' is pushed up in the direction of the nut 8. Because it is considered that fastening only the nut 8 might deform the resin gasket 13, the metal washer 7 is disposed between the resin gasket 13 and the nut 8. An aluminum alloy is used for the metal washer 7 and the nut 8. After the nut 8 is fastened as described above, the lid 2 is put into a thermostat bath to cure the resin.

After the resin material 6' became cured, the lid 2 was subjected to a helium leak test to identify the presence of any leak. In order to identify any leak from a fastening portion around the electrode terminal 3, a distal end of a helium leak tester was attached to the lid 2 around the electrode terminal 3, and the pressure was reduced. After reducing the pressure to a constant pressure, a helium gas was sprayed from outside so that the helium gas would be detected in case of any leak.

As a result of the test, no leak from the lid 2 was observed in the structure according to the embodiment. It is considered that no leak was identified because the recess 10 was filled with the resin material 6' in addition to the elastic member 4 in the embodiment. As another effect of filling the resin material 6', it is considered that rotation of the nut 8 is prevented by the resin material 6' which has been pushed up into a space between the threaded terminal portion 3A of the electrode terminal 3 and the nut 8 and has become cured. When the nut 8 was rotated in the loosening direction using a torque wrench after the resin material 6' became cured, a value of about 60 N was indicated. The value is about four times the torque applied for fastening, and it was found that the resin material 6' was sufficiently effective in preventing rotation of the nut 8. Thus, prevention of loosening of the nut 8 over a long period of use is also expected.

(Second Embodiment)

Figure 5:
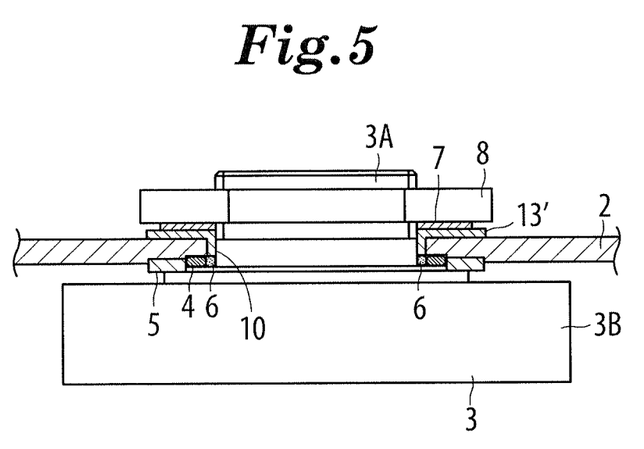
FIG. 5 is a cross-sectional view of a terminal attachment structure of a non-aqueous electrolyte secondary battery used to describe a terminal seal structure according to a second embodiment of the present invention.
Figure 6:
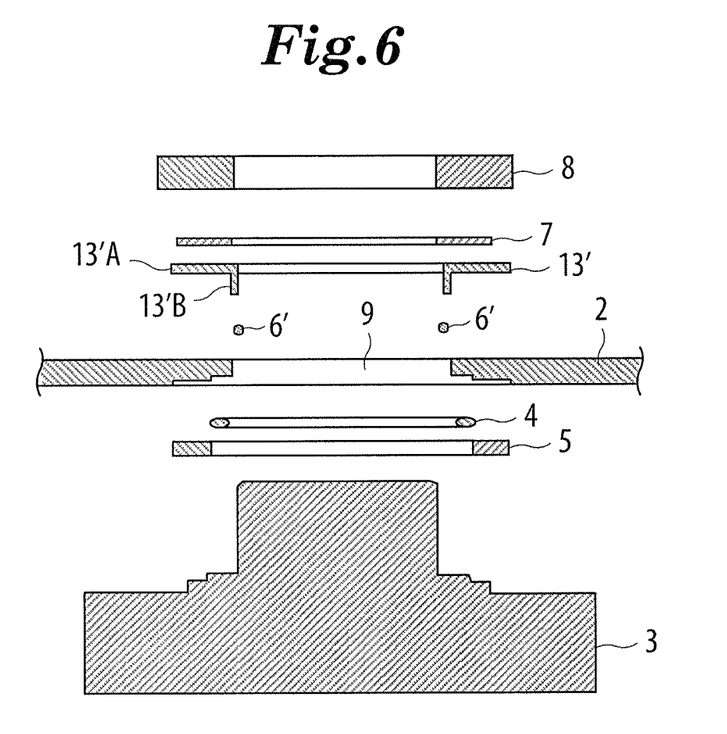
FIG. 6 is an exploded cross-sectional view of the terminal attachment structure of FIG. 5.
Figure 7A:
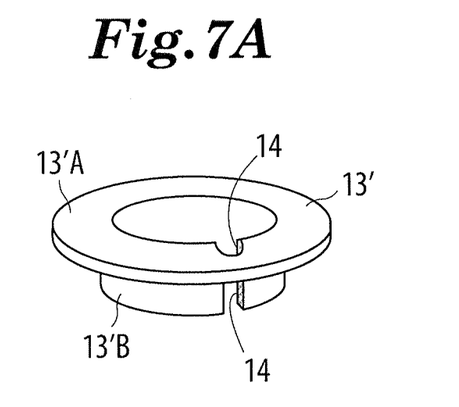
FIGS. 7A and 7B show a modification of a gasket.
Figure 7B:
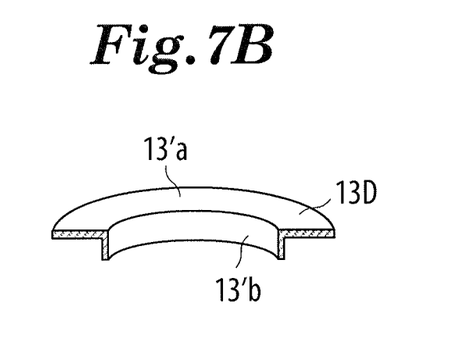

FIG. 5 is a cross-sectional view of a terminal attachment structure of a non-aqueous electrolyte secondary battery used to describe a terminal seal structure according to a second embodiment of the present invention. In FIG. 5, the electrode terminal 3 and the nut 8 are not shown in cross section. FIG. 6 is an exploded cross-sectional view of the terminal attachment structure of FIG. 5. The second embodiment is different from the first embodiment in shape of a first gasket 13'. The structure of the embodiment is otherwise the same as that of the first embodiment. That is, the positional relationship between the lid 2 and the electrode terminal 3 and the material and the installation state of the elastic member 4 in the second embodiment are the same as those in the first embodiment. In the embodiment, as shown in FIG. 6, the first gasket 13' is structured to include a gasket body 13'A and a fitted portion 13'B, which are integral with each other. The fitted portion 13'B is fitted in an annular recess formed between the terminal through hole 9 and the threaded terminal portion 3A. The first gasket 13' is shaped such that the cylindrical fitted portion 13'B having a length equal to or more than the thickness of the disk-like gasket body 13'A having a hole opening at the center is integrally formed at an inner edge portion of the disk-like gasket body 13'A. In the embodiment, as shown in FIG. 7A, a notch 14 may be formed in each of the gasket body 13'A and the fitted portion 13'B, and the resin material 6' may be filled from the notch 14. In addition, as shown in FIG. 7B, the first bracket 13' may be formed by assembling two divided brackets 13'D obtained by dividing a single bracket 13' into two pieces. The divided brackets 13'D each include a divided bracket body 13'a and a divided fitted portion 13'b. If the divided brackets 13'D are used, the divided fitted portions 13'b of the two divided brackets 13'D are disposed in a part of the annular recess 10 formed between the lid 2 and the electrode terminal 3. The shape and the size of the divided fitted portions 13'b are determined such that a passage configured for passage of a resin is formed between the divided fitted portions 13'b of the two divided brackets 13'D. The resin material 6' is filled from the space. In addition, the length of the divided fitted portions 13'b of the divided brackets 13'D is less than the plate thickness of the lid 2. The number of divided brackets may be a number other than two, such as four, for example.

If the fitted portion 13'B of the bracket 13' is fitted into the annular recess 10 and the filled resin portion 6 is formed by filling the resin material 6' as in the embodiment, the position of the annular elastic member 4 can be fixed.

A leak test was also conducted for the second embodiment in the same method as for the first embodiment. As a result, no leak was identified at the same degree of vacuum as in the first embodiment. Hence, it was confirmed that the structure according to the second embodiment also caused no leak.

(Third Embodiment)

Figure 8:
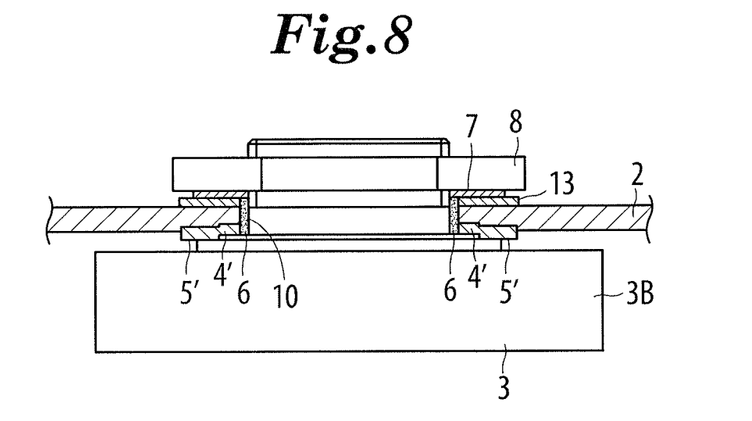
FIG. 8 is a cross-sectional view of a terminal attachment structure of a non-aqueous electrolyte secondary battery used to describe a terminal seal structure according to a third embodiment of the present invention.
Figure 9:
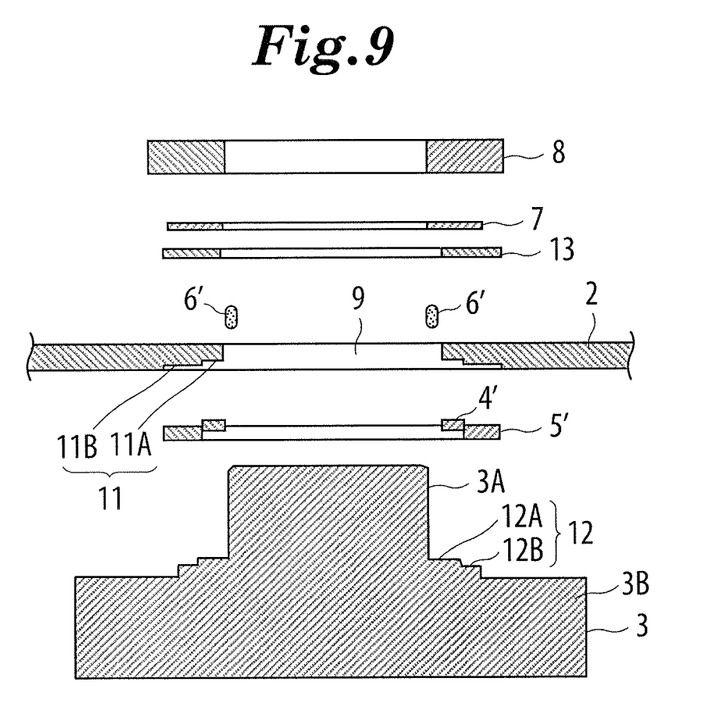
FIG. 9 is an exploded cross-sectional view of the terminal attachment structure of FIG. 8.

FIG. 8 is a cross-sectional view of a terminal attachment structure of a non-aqueous electrolyte secondary battery used to describe a terminal seal structure according to a third embodiment of the present invention. In FIG. 8, the electrode terminal 3 and the nut 8 are not shown in cross section. FIG. 9 is an exploded cross-sectional view of the terminal attachment structure of FIG. 8. The third embodiment is different from the first embodiment in that no elastic member 4 as an independent component is provided. In the embodiment, a second gasket 5' is formed from an elastic gasket material, and the second gasket 5' and an elastic member 4' are integrally formed with each other. The structure of the embodiment is otherwise the same as that of the first embodiment. That is, the positional relationship between the lid 2 and the electrode terminal 3 and the material and the installation state of main portions in the third embodiment are the same as those in the first embodiment.

In the embodiment, the elastic member 4' is integrally formed with the gasket 5'. The elastic member 4' is disposed between the first lid-side annular stepped portion 11A and the first terminal-side annular stepped portion 12A, and the gasket 5' is disposed between the second lid-side annular stepped portion 11B of the lid 2 and the second terminal-side annular stepped portion 12B of the terminal body portion 3B. If the elastic member 4' and the gasket 5' are disposed in this way, a linear seal is formed at the boundary between the elastic member 4' and the gasket 5'. At this time, if the gasket 5' forming the elastic member 4' is made of a soft material that is deformable in conformity to the shape of the elastic member 4', it is considered that the strength of the seal portion may not be maintained and that leak may be caused. Therefore, it is required that the material of the elastic member 4' and the gasket 5' should have some degree of hardness and a reaction force against compression at the same time. Therefore, the material of the elastic member 4' and the gasket 5' is preferably a polymer-based material used for the resin gasket, rather than a rubber-based material. In the embodiment, perfluoro alkoxy alkane (PFA) is selected among others. The elastic member 4' and the gasket 5' have a disk-like shape with a large width as with the resin gasket 5 according to the first embodiment. A through hole is formed at the center portion of the elastic member 4' made of a gasket material, and the threaded terminal portion 3A of the electrode terminal 3 passes through the through hole. Also in the embodiment, the filled resin portion 6 is formed by filling the resin material 6' into the annular recess 10 defined by the inner peripheral portion of the elastic member 4', the terminal body portion 3B of the electrode terminal 3, and the lid 2. The threaded terminal portion 3A of the electrode terminal 3 is inserted into the resin gasket 13 and the metal washer 7, and fastened by the nut 8.

In the embodiment, it is important to manage the amount of crushing of the elastic member 4' made of a gasket material by managing the fastening torque. In the embodiment, the fastening torque is set such that the amount of crushing of the gasket of the elastic member 4' is approximately 50% of the original thickness.

After fastening was done as mentioned above, a leak test was also conducted for this embodiment in the same method as for the first embodiment. As a result, no leak was identified in the leak test at the same degree of vacuum as in the first embodiment. Hence, it was confirmed that the structure according to the embodiment also caused no leak.

(Fourth Embodiment)

Figure 10:
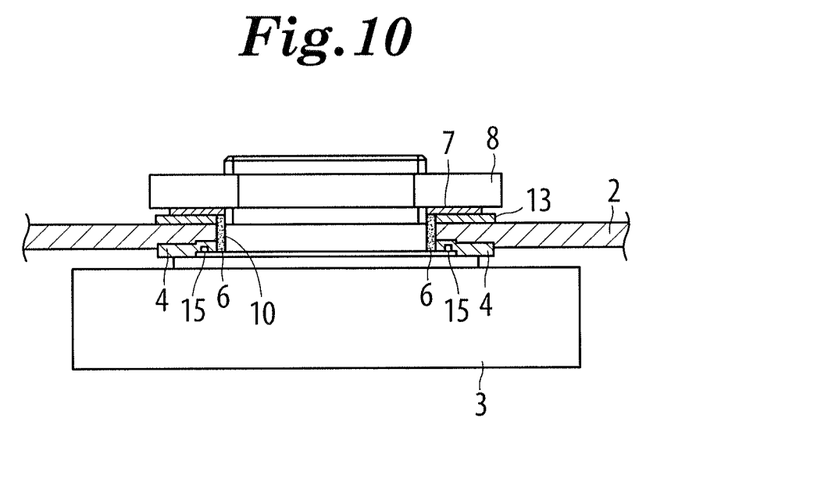
FIG. 10 is a cross-sectional view of a terminal attachment structure of a non-aqueous electrolyte secondary battery used to describe a terminal seal structure according to a fourth embodiment of the present invention.
Figure 11:
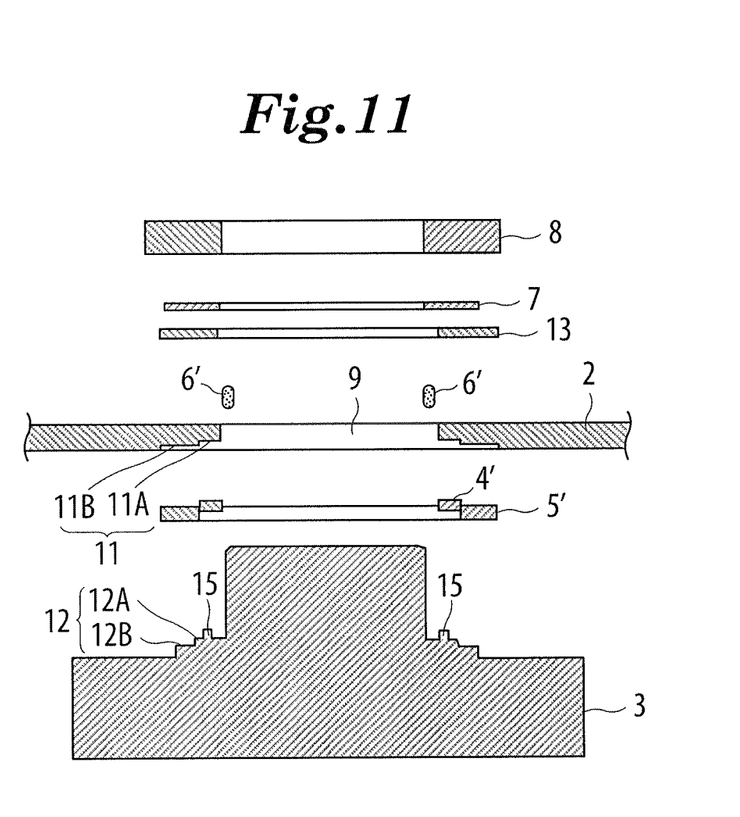
FIG. 11 is an exploded cross-sectional view of the terminal attachment structure of FIG. 10.

FIG. 10 is a cross-sectional view of a terminal attachment structure of a non-aqueous electrolyte secondary battery used to describe a terminal seal structure according to a fourth embodiment of the present invention. In FIG. 10, the electrode terminal 3 and the nut 8 are not shown in cross section. FIG. 11 is an exploded cross-sectional view of the terminal attachment structure of FIG. 10. In the fourth embodiment, as in the third embodiment, the second gasket 5' is formed from an elastic gasket material, and the second gasket 5' and the elastic member 4' are integrally formed with each other. In the embodiment, an annular projection 15 is integrally formed on the first terminal-side annular stepped portion 12A provided to the terminal body portion 3A of the electrode terminal 3. The structure of the embodiment is otherwise the same as that of the third embodiment. As in the third embodiment, by fastening the nut 8, the electrode terminal 3 is pulled up, and the gasket of the elastic member 4' made of a gasket material is crushed by the stepped portions of the lid 2 and the electrode terminal 3. Because the annular projection 15 on the first terminal-side annular stepped portion 12A provided to the terminal body portion 3A of the electrode terminal 3 also compresses the gasket of the elastic member 4', a linear seal is more reliably formed.

After fastening was done as mentioned above, a leak test was also conducted for this embodiment in the same method as for the first embodiment. As a result, no leak was identified in the leak test at the same degree of vacuum as in the first embodiment. Hence, it was confirmed that the structure according to the embodiment also caused no leak.

REFERENCE SIGN LIST

1 Case Body Portion
2 Lid
3 Electrode terminal
4 Elastic Member
5, 5' Gasket
6 Filled Resin Portion
6' Resin Material
7 Metal Washer
8 Nut
9 Terminal Through Hole
10 Recess

The invention claimed is:

1. A non-aqueous electrolyte secondary battery comprising:
a battery case including a case body portion having an opening, and a lid having a plurality of terminal through holes and configured to tightly seal the opening of the case body portion;
an electrode group and an organic electrolyte housed in the battery case;
a plurality of electrode terminals each including a terminal body portion electrically connected to the electrode group and a threaded terminal portion integrally formed with the terminal body portion and configured to pass through one of the terminal through holes of the lid, wherein each electrode terminal is fixed to the lid with a nut fastened around the threaded terminal portion of the electrode terminal;
a first gasket fitted to the threaded terminal portion and disposed between the lid and the nut;
a second gasket disposed on the terminal body portion to surround the threaded terminal portion, and disposed between the terminal body portion of the electrode terminal and the lid of the battery case;
an annular elastic member disposed on the terminal body portion to surround the threaded terminal portion on an inner side of the second gasket, the annular elastic member being compressed between the terminal body portion of the electrode terminal and the lid of the battery case; and
a filled resin portion formed by filling a resin material into an annular recess defined by at least the annular elastic member, the threaded terminal portion, and the terminal body portion and letting the resin material become cured, wherein:
a stepped groove is formed in each of the lid and the terminal body portion of the electrode terminal, and the annular elastic member and the second gasket are disposed in the stepped grooves;
the stepped groove formed in the lid includes a first lid-side annular stepped portion formed concentrically with the terminal through hole, and a second lid-side annular stepped portion formed concentrically and continuously with the first lid-side annular stepped portion, the first lid-side annular stepped portion and the second lid-side annular stepped portion being formed in a back surface portion, which faces the terminal body portion, of the lid;
the stepped groove formed in the terminal body portion includes a first terminal-side annular stepped portion formed concentrically with the threaded terminal portion and facing the first lid-side annular stepped portion with the threaded terminal portion fitted in the terminal through hole, and a second terminal-side annular stepped portion formed concentrically and continuously with the first terminal-side annular stepped portion and facing the second lid-side annular stepped portion with the threaded terminal portion being fitted in the terminal through hole;
the annular elastic member is disposed between the first lid-side annular stepped portion and the first terminal-side annular stepped portion;
the second gasket is disposed between the second lid-side annular stepped portion and the second terminal-side annular stepped portion; and
the second gasket is operable to prevent the annular elastic member from being out of alignment in a radial direction.

2. The non-aqueous electrolyte secondary battery according to claim 1, wherein
the second gasket is formed from an elastic material, and the second gasket and the annular elastic member are integrally formed with each other.

3. The non-aqueous electrolyte secondary battery according to claim 1, wherein
the first gasket includes a fitted portion fitted in the annular recess formed between the terminal through hole and the threaded terminal portion.

4. The non-aqueous electrolyte secondary battery according to claim 3, wherein the fitted portion of the first gasket is formed with a passage configured to introduce the resin material into the annular recess.

5. The non-aqueous electrolyte secondary battery according to claim 1, wherein
the annular elastic member is made of a rubber-based material.

6. The non-aqueous electrolyte secondary battery according to claim 1, wherein
the second gasket is formed of a resin material.

7. The non-aqueous electrolyte secondary battery according to claim 1, wherein
the second gasket is at least one kind selected from a rubber gasket, a synthetic resin gasket, a semi-metallic gasket, and an expanded graphite gasket.

8. The non-aqueous electrolyte secondary battery according to claim 1, wherein
the filled resin portion is formed by curing one of a one-part resin material and a two-part mixed resin material.

9. The non-aqueous electrolyte secondary battery according to claim 1, wherein:
the annular elastic member is in contact with the second gasket.

10. The non-aqueous electrolyte secondary battery according to claim 5, wherein
the rubber-based material is at least one kind selected from chloroprene rubber, nitrile rubber, ethylene propylene rubber, butyl rubber, urethane rubber, fluororubber, and silicon rubber.

* * * * *